United States Patent
Lager et al.

(10) Patent No.: US 11,511,435 B2
(45) Date of Patent: Nov. 29, 2022

(54) ROBOT-CONVEYOR CALIBRATION METHOD, ROBOT SYSTEM AND CONTROL SYSTEM

(71) Applicant: ABB Schweiz AG, Baden (CH)

(72) Inventors: Anders Lager, Västerås (SE); Johnny Holmberg, Hallstahammar (SE); Magnus Wahlström, Västerås (SE); Michael Stenbacka, Västerås (SE)

(73) Assignee: ABB Schweiz AG, Baden (CH)

( * ) Notice: Subject to any disclaimer, the term of this patent is extended or adjusted under 35 U.S.C. 154(b) by 239 days.

(21) Appl. No.: 16/612,955

(22) PCT Filed: May 22, 2017

(86) PCT No.: PCT/EP2017/062287
§ 371 (c)(1),
(2) Date: Nov. 12, 2019

(87) PCT Pub. No.: WO2018/215047
PCT Pub. Date: Nov. 29, 2018

(65) Prior Publication Data
US 2020/0164518 A1 May 28, 2020

(51) Int. Cl.
*B25J 9/16* (2006.01)
*B25J 9/00* (2006.01)

(52) U.S. Cl.
CPC .......... *B25J 9/1692* (2013.01); *B25J 9/0093* (2013.01); *B25J 9/1697* (2013.01)

(58) Field of Classification Search
CPC ...... B25J 9/1692; B25J 9/0093; B25J 9/1697; B25J 9/1694; B25J 9/023; B25J 9/02
(Continued)

(56) References Cited

U.S. PATENT DOCUMENTS 7,386,367 B2 * 6/2008 Watanabe .............. B25J 9/1697
901/7
8,930,009 B2 1/2015 Miyoshi
(Continued)

FOREIGN PATENT DOCUMENTS

DE 10162967 A1 * 7/2002 ............ B25J 9/1669
DE 10351669 A1 6/2005
(Continued)

OTHER PUBLICATIONS

International Search Report and Written Opinion of the International Searching Authority Application No. PCT/EP2017/062287 Completed: Jan. 25, 2018; dated Feb. 6, 2018 9 pages.
(Continued)

*Primary Examiner* — B M M Hannan
(74) *Attorney, Agent, or Firm* — Whitmyer IP Group LLC

(57) ABSTRACT

A method for calibrating a robot coordinate system of a robot with a conveyor coordinate system of a movable conveyor member, the method including providing a sensor configured to detect positions of the robot in a non-contact manner; detecting a position of the robot when the conveyor member is positioned at a first operating position; detecting a position of the robot and/or of the conveyor member by the sensor in the sensor coordinate system when the conveyor member is positioned at a second operating position different from the first operating position; and determining a relationship between the robot coordinate system and the conveyor coordinate system based on at least one detected position of the robot in the sensor coordinate system. A robot system and a control system are also provided.

15 Claims, 4 Drawing Sheets

(58) Field of Classification Search
USPC .......................................... 700/254, 258–259
See application file for complete search history.

(56) References Cited

U.S. PATENT DOCUMENTS

| | | | | |
|---|---|---|---|---|
| 2011/0022216 | A1* | 1/2011 | Andersson | G05B 19/401 |
| | | | | 700/114 |
| 2012/0229620 | A1 | 9/2012 | Ikeda et al. | |
| 2012/0236140 | A1* | 9/2012 | Hazeyama | B25J 9/1697 |
| | | | | 348/94 |
| 2014/0018957 | A1* | 1/2014 | Matsumoto | B25J 9/1692 |
| | | | | 700/251 |
| 2016/0001983 | A1* | 1/2016 | Ooba | B65G 37/00 |
| | | | | 414/787 |
| 2016/0059419 | A1* | 3/2016 | Suzuki | B25J 9/1697 |
| | | | | 700/114 |
| 2016/0068352 | A1 | 3/2016 | Oda | |
| 2016/0176054 | A1* | 6/2016 | Foerster | B25J 19/021 |
| | | | | 700/254 |
| 2016/0346932 | A1* | 12/2016 | Deng | B25J 9/1692 |
| 2017/0028550 | A1* | 2/2017 | Terada | B25J 9/162 |
| 2017/0028561 | A1* | 2/2017 | Yamada | B25J 19/023 |
| 2017/0066133 | A1 | 3/2017 | Ooba et al. | |
| 2017/0139407 | A1* | 5/2017 | Sakaguchi | B25J 9/1671 |
| 2018/0243911 | A1* | 8/2018 | Harada | B25J 9/1697 |
| 2018/0361587 | A1* | 12/2018 | Purrucker | B25J 9/1692 |
| 2019/0022867 | A1* | 1/2019 | Deng | B25J 19/02 |
| 2020/0306957 | A1* | 10/2020 | Oono | B25J 19/023 |
| 2020/0401801 | A1* | 12/2020 | Ooba | H04N 7/18 |

FOREIGN PATENT DOCUMENTS

| | | | | |
|---|---|---|---|---|
| DE | 102015104582 | A1 * | 9/2016 | |
| EP | 2497611 | A2 * | 9/2012 | B25J 9/1692 |
| EP | 3020517 | A2 | 5/2016 | |
| JP | H09131683 | A | 5/1997 | |
| JP | 2005262369 | A * | 9/2005 | |
| TW | 201618913 | A | 6/2016 | |
| WO | 0045229 | A1 | 8/2000 | |
| WO | 2015121767 | A1 | 8/2015 | |

OTHER PUBLICATIONS

International Preliminary Report of Patentability Application No. PCT/EP2017/062287 dated Nov. 26, 2019 8 pages.
European Office Action; Application No. 17 726 240.9; dated Sep. 29, 2021; 6 Pages.
Chinese Office Action and Seaarch Report; Application No. 201780090669.6; dated Apr. 19, 2022; 15 Pages.

* cited by examiner

ROBOT-CONVEYOR CALIBRATION METHOD, ROBOT SYSTEM AND CONTROL SYSTEM

TECHNICAL FIELD

The present disclosure generally relates to the calibration of a robot coordinate system of a robot with a conveyor coordinate system of a movable conveyor member. In particular, a method for such calibration by using a non-contact sensor, a robot system comprising a robot, a conveyor and a non-contact sensor for such calibration, and a control system for such calibration, are provided.

BACKGROUND

Calibrating a robot to a conveyor can be a tedious and difficult operation, but is also very important. For example, in a pick and place robot system the picking accuracy, i.e. the positioning accuracy of the robot when picking objects from a moving conveyor member of a conveyor, is completely dependent on that the relation between the positions of the robot and the conveyor member are well established.

The most common procedure used today for calibrating a robot to a conveyor member is to manually perform the calibration steps of the system. However, this procedure requires expert skills (e.g. knowledge and experience) and is time consuming. Having a good accuracy also requires manual skills when a robot tool center point (TCP) has to be jogged with high accuracy to different reference points that are recorded.

U.S. Pat. No. 2,017,066,133 A1 discloses a coordinate system setting method configured to set a conveyor coordinate system having a predetermined relationship with a base coordinate system of a robot, as a coordinate system for defining a position of an object on a conveyor, in a system having a configuration in which a position of the object conveyed by the conveyor is detected and the robot performs a work with respect to the object based on a detected position. The method uses a plurality of features on a movable part of the conveyor and a non-contact sensor provided on the robot.

WO 0045229 A1 discloses an apparatus and method for enabling an uncalibrated, model independent controller for a mechanical system using a dynamic quasi-Newton algorithm which incorporates velocity components of any moving system parameter(s).

WO 2015121767 A1 discloses an automatic calibration method for a robot system comprising calibrating intrinsic parameters of a sensor and a sensor coordinate system, controlling a robot under the guidance of the calibrated sensor, and calculating a transfer matrix of a tool coordinate system with respect to a tool center point coordinate system of the robot.

U.S. Pat. No. 2,012,229,620 A1 discloses an image processing apparatus including a management unit, an update unit, an identifying unit, and a transmitting unit.

SUMMARY

One object of the present disclosure is to provide a method for calibrating a robot coordinate system of a robot with a conveyor coordinate system of a movable conveyor member that enables a simple, fast, automated and/or accurate calibration.

A further object of the present disclosure is to provide a robot system configured to carry out such calibration that solves the foregoing object.

A still further object of the present disclosure is to provide a control system configured to control such calibration that solves the foregoing object.

According to one aspect, there is provided a method for calibrating a robot coordinate system of a robot with a conveyor coordinate system of a movable conveyor member. The method comprises providing a sensor configured to detect positions of the robot in a non-contact manner; detecting a position of the robot by the sensor in a sensor coordinate system of the sensor when the conveyor member is positioned at a first operating position; detecting a position of the robot and/or a position of the conveyor member by the sensor in the sensor coordinate system when the conveyor member is positioned at a second operating position different from the first operating position; and determining a relationship between the robot coordinate system and the conveyor coordinate system based on at least one detected position of the robot in the sensor coordinate system.

The conveyor member may be comprised by a conveyor. The conveyor member may be arranged to convey objects into (or within) a working range of the robot. As one example, the conveyor member may be constituted by a linear conveyor member, e.g. a conveyor belt. Alternatively, the conveyor member may be constituted by a circular conveyor member.

The conveyor member may be moved from the first position to the second position or vice versa. The conveyor member does not have to stop at the first and second operating positions. According to one variant, the conveyor member moves continuously, e.g. at low speed, through the first and second operating positions. However, according to one variant, the conveyor member stops at one or both of the first and second operating positions. Also the robot may or may not be stationary when a position of the same is detected.

The sensor may be of any type to detect positions of the robot in a non-contact manner. The sensor may for example be constituted by a vision sensor, such as a two dimensional (2D) or three dimensional (3D) vision sensor, e.g. camera. The sensor may alternatively be constituted by a radar.

As used herein, a detected position may have a translational component, e.g. an x, y and z offset. Optionally, a detected position also has an orientation component, e.g. three Euler angles, to indicate the orientation of the detected position (e.g. the orientation of a tool or a marker).

By providing the sensor to detect positions of the robot in a non-contact manner, a simpler installation and removal of the sensor is made possible in comparison with the attachment of a sensor to the robot. For example, the provision of a sensor configured to detect positions of the robot in a non-contact manner may include a simple placement of the sensor on the conveyor member or on a stationary structure, such as a stationary part of the conveyor or on a stationary structure on the floor. The simple installation and removal of the sensor contributes to a faster calibration procedure and a reduced downtime of the robot system.

In case the sensor is positioned on a stationary structure, e.g. outside the conveyor member, the sensor may remain at this position during operation of the robot system. Thereby, a further calibration procedure may be started quickly after stopping the operation of the robot system.

The robot may comprise a tool and the position of the robot may be a position of the tool. The position of the tool in the robot coordinate system is typically known for industrial robots. However, the position of the robot may be any position that can be recognized by the sensor and that has a known or calculable position in the robot coordinate system. For example, a marker may be attached to the robot to define the position of the robot to be detected by the sensor.

The method may further comprise detecting positions of the robot in different poses by the sensor in the sensor coordinate system when the conveyor member is in the first operating position and/or when the conveyor member is in the second operating position. For example, the sensor may detect two poses of the robot when the conveyor member is positioned at the first operating position and may detect one pose of the robot when the conveyor member is positioned at the second operating position. In this case, the robot may move from the first pose to the second pose before the conveyor member moves from the first operating position to the second operating position. As a further example, the sensor may detect only a first pose of the robot when the conveyor member is positioned at the first operating position and may detect only a second pose of the robot when the conveyor member is positioned at the second operating position.

The sensor may be positioned on the conveyor member and the method may comprise detecting a position of the robot by the sensor in the sensor coordinate system when the conveyor member is positioned at the first operating position and when the conveyor member is positioned at the second operating position. The sensor can for example simply be placed on the conveyor member or be fixed to the conveyor member, e.g. by using a fixture. In this case, the step of determining a relationship between the robot coordinate system and the conveyor coordinate system may be based on both detected positions of the robot in the sensor coordinate system (i.e. in the first and second operating positions of the conveyor member).

The method may further comprise determining a movement direction of the conveyor member in the robot coordinate system based on the detected positions of the robot in the sensor coordinate system; and determining a relationship between the robot coordinate system and the conveyor coordinate system based on the determined movement direction of the conveyor member. For example, if the sensor is positioned on a linear conveyor member and the conveyor member is moved from the first operating position to the second operating position, the movement of the sensor can be defined by a vector that is parallel with the movement direction of the conveyor member. If the conveyor member is constituted by a circular conveyor member, the movement direction of the conveyor member can be determined based on the detected positions of the robot in three different operating positions of the conveyor member. The movement direction of the conveyor member may first be determined in the sensor coordinate system and then be determined in the robot coordinate system.

The method may be used to calibrate several robots along the conveyor member. In this case, the method may further comprise moving the conveyor member from the second operating position to a third operating position; detecting a position of a second robot by the sensor in the sensor coordinate system when the conveyor member is positioned at the third operating position; moving the conveyor member from the third operating position to a fourth operating position; detecting a position of the second robot by the sensor in the sensor coordinate system when the conveyor member is positioned at the fourth operating position; and determining a relationship between a robot coordinate system of the second robot and the conveyor coordinate system based on the detected positions of the second robot in the sensor coordinate system, i.e. based on at least one position of the second robot when the conveyor member is positioned at the third operating position and based on at least one position of the second robot when the conveyor member is positioned at the fourth operating position. The third operating position may be downstream of the second operating position and the fourth operating position may be downstream of the third operating position, as seen in a movement direction of the conveyor member.

The relationship between the sensor coordinate system and the conveyor coordinate system may be known beforehand. Alternatively, it can e.g. be detected or set during the calibration. This may be useful when positions of the conveyor member are not registered by the sensor, e.g. when the sensor is arranged to face only the robot.

The sensor may additionally be configured to detect positions of the conveyor member in a non-contact manner. Thus, the sensor may be positioned on the conveyor member to face both the robot and the conveyor member. In this case, the sensor may detect a position of the robot when the conveyor member is positioned at the first operating position, detect a position of the robot when the conveyor member is positioned at the second operating position, and detect a position of the conveyor member when the conveyor member is positioned either at the first operating position, the second operating position, or any other operating position.

The method may further comprise detecting a position of the conveyor member by the sensor in the sensor coordinate system; and determining a relationship between the sensor coordinate system and the conveyor coordinate system based on the detected position of the conveyor member in the sensor coordinate system.

At least one calibration marker may be provided on the conveyor member for the detection of the position of the conveyor member. The position of the at least one calibration marker in the conveyor coordinate system may be known beforehand. Alternatively, it can e.g. be detected or set during the calibration.

The sensor may be positioned on a stationary structure such that the conveyor member moves relative to the sensor and the sensor may additionally be configured to detect positions of the conveyor member in a non-contact manner. Thus, the sensor may be positioned on the stationary structure to face both the robot and the conveyor member. In this case, the step of determining a relationship between the robot coordinate system and the conveyor coordinate system may be based on only one detected position of the robot in the sensor coordinate system, i.e. when the conveyor member is positioned either at the first operating position, the second operating position, or any other operating position.

The stationary structure may for example be constituted by a stationary part of the conveyor or by a stationary structure on the floor, such as a stand or a table, on which the sensor is positioned. A stationary structure according to the present disclosure may also be constituted by a movable device that is kept stationary when carrying out the calibration method. At least one calibration marker may be provided on the conveyor member for the detection of the position of the conveyor member.

The method may further comprise detecting a position of the at least one calibration marker by the sensor in the sensor coordinate system when the conveyor member is positioned at the first operating position; detecting a position of the at least one calibration marker by the sensor in the sensor coordinate system when the conveyor member is positioned at the second operating position; determining a movement direction of the conveyor member in the robot coordinate system based on the detected positions of the at least one calibration marker in the sensor coordinate system; and determining a relationship between the robot coordinate system and the conveyor coordinate system based on the determined movement direction of the conveyor member. The position of the at least one calibration marker in the conveyor coordinate system may be known beforehand. Alternatively, it can e.g. be detected or set during the calibration.

If the conveyor member is constituted by a linear conveyor member, the movement direction of the conveyor member can be determined based on the detected positions of the at least one calibration marker in two different operating positions of the conveyor member. If the conveyor member is constituted by a circular conveyor member, the movement direction of the conveyor member can be determined based on the detected positions of the at least one calibration marker in three different operating positions of the conveyor member.

According to a further aspect, there is provided a robot system comprising at least one robot, a movable conveyor member and a sensor configured to detect positions of the robot in a non-contact manner. The robot system may be configured to carry out any method according to the present disclosure. The robot system may comprise a plurality of robots working along the conveyor member (e.g. by picking objects). The one or more robots, the conveyor member and the sensor of the robot system may be of any type according to the present disclosure.

According to a further aspect, there is provided a control system for calibrating a robot coordinate system of a robot with a conveyor coordinate system of a movable conveyor member in a robot system comprising the robot, the conveyor member and a sensor configured to detect positions of the robot in a non-contact manner, the control system comprising a data processing device and a memory having a computer program stored thereon, the computer program comprising program code which, when executed by the data processing device, causes the data processing device to perform the steps of controlling the sensor to detect a position of the robot in a sensor coordinate system of the sensor when the conveyor member is positioned at a first operating position; controlling the sensor to detect a position of the robot and/or a position of the conveyor member in the sensor coordinate system when the conveyor member is positioned at a second operating position different from the first operating position; and determining a relationship between the robot coordinate system and the conveyor coordinate system based on at least one detected position of the robot in the sensor coordinate system. The control system thereby provides for an automated and touchless calibration method.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1A:
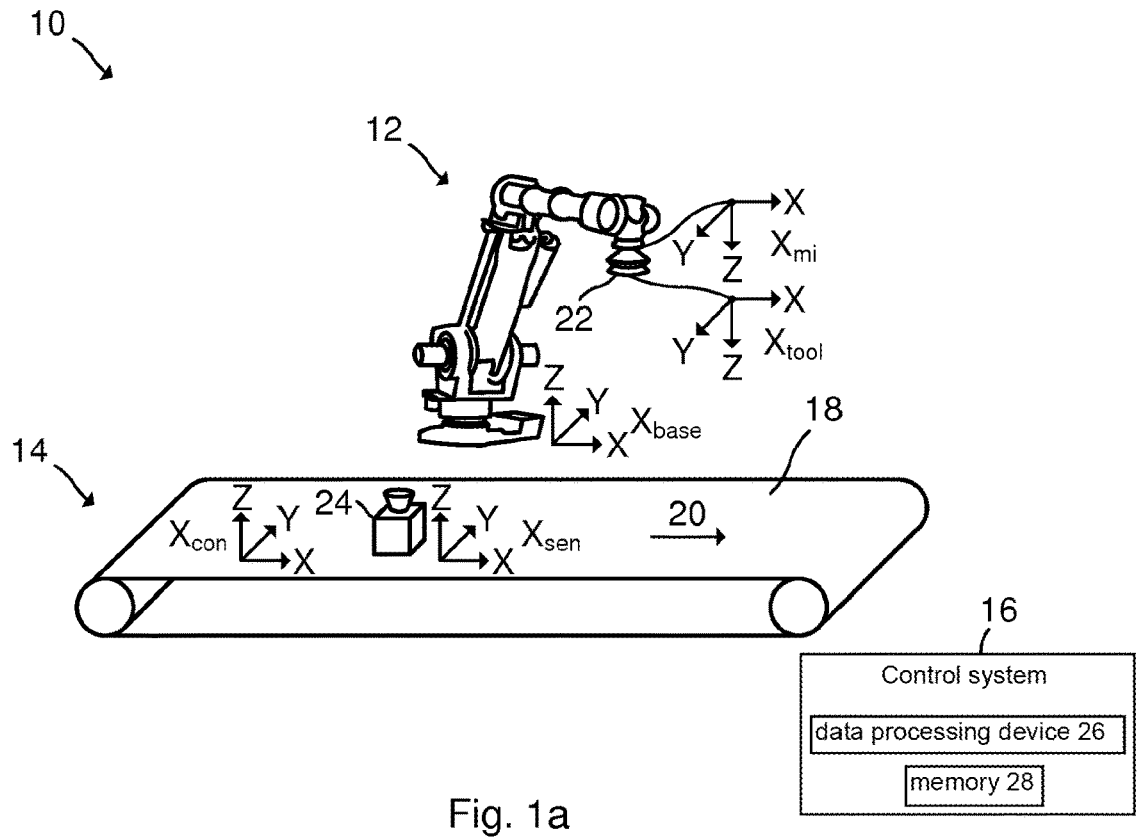
FIG. 1a: schematically represents a perspective view of a robot system according to a first embodiment where a conveyor member is positioned at a first operating position.

In the following, a robot-conveyor calibration method using a non-contact sensor, a robot system comprising a robot, a conveyor and a non-contact sensor for such calibration and a control system for such calibration, will be described. The same reference numerals will be used to denote the same or similar structural features.

Figure 1B:
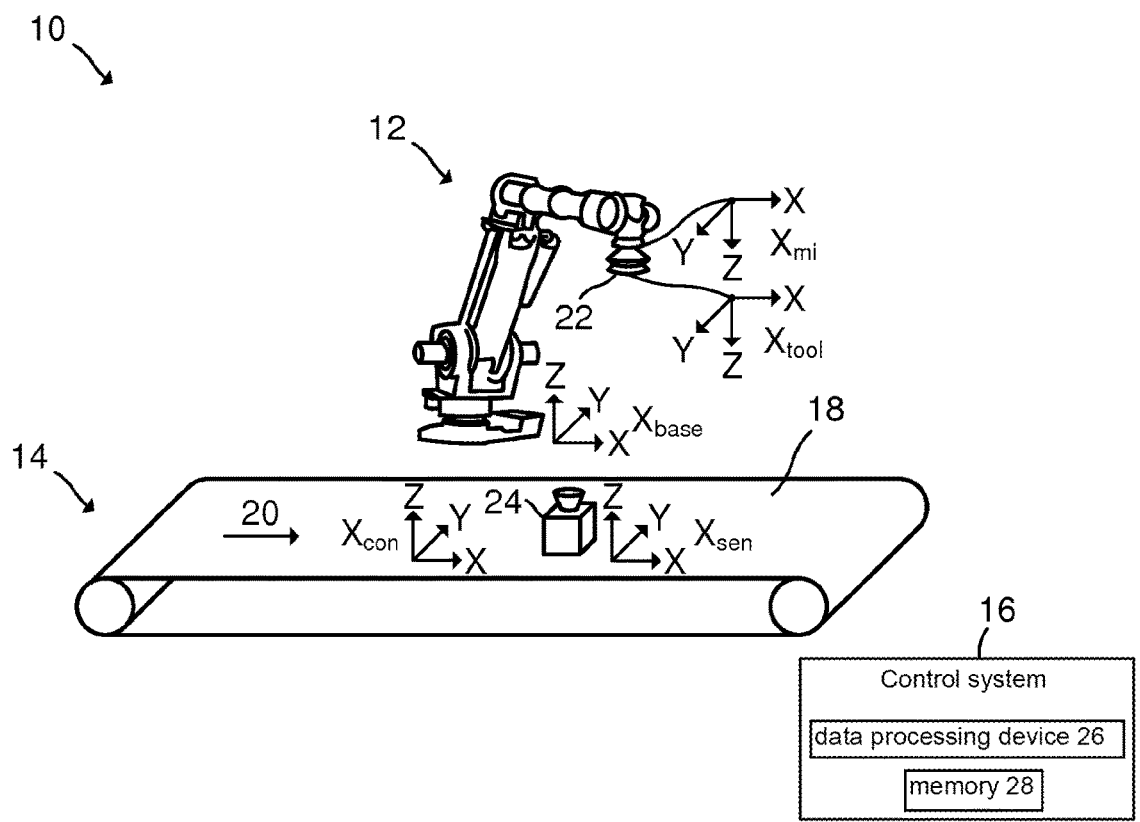
FIG. 1b: schematically represents a perspective view of the robot system in FIG. 1a but where the conveyor member is positioned at a second operating position.

FIGS. 1a and 1b schematically represent perspective views of a robot system 10 according to a first embodiment. The robot system 10 comprises a robot 12, a conveyor 14 and a control system 16.

The conveyor 14 comprises a movable conveyor member 18, here exemplified as a conveyor belt. In operation of the robot system 10, the conveyor member 18 conveys objects (not shown) in a movement direction 20 into a working region of the robot 12 where one or more of the objects are handled by the robot 12. One example of a handling operation that may performed by the robot 12 is a picking operation. The robot 12 may thus pick objects from the conveyor member 18 and place the objects at a place location (not illustrated). Although the robot 12 is illustrated as an articulated robot, the robot 12 may be of any type. As one example, the robot 12 may alternatively be constituted by a FlexPicker® robot.

The robot 12 of the example in FIG. 1a comprises three robot coordinate systems, a base coordinate system $X_{base}$, a tool coordinate system $X_{tool}$, and a mounting interface coordinate system $X_{mi}$. The base coordinate system $X_{base}$ is a Cartesian coordinate system having its origin at the base of the robot 12. The tool coordinate system $X_{tool}$ is a Cartesian coordinate system having its origin at a tool 22 (here exemplified as a vacuum gripper with a single suction cup) of the robot 12. The mounting interface coordinate system $X_{mi}$ is a Cartesian coordinate system having its origin at the mounting interface of the tool 22. Either the base coordinate system $X_{base}$, the tool coordinate system $X_{tool}$, the mounting interface coordinate system $X_{mi}$, or any other coordinate system of the robot 12 may be used as the robot coordinate system of the robot 12 for calibrating with a conveyor coordinate system $X_{con}$ of the conveyor member 18 according to the present disclosure. The conveyor coordinate system $X_{con}$ is also a Cartesian coordinate system and has its origin on the conveyor member 18.

When the robot 12 performs handling operations on one or more objects, it is important that the robot coordinate system $X_{base}$, $X_{mi}$, $X_{tool}$ of the robot 12 and the conveyor coordinate system $X_{con}$ of the conveyor member 18 are well calibrated. With a good calibration, positions defined in the conveyor coordinate system $X_{con}$, such as positions of objects on the conveyor member 18, can be accurately defined in the robot coordinate system $X_{base}$, $X_{mi}$, $X_{tool}$. Thereby, the precision of the handling operations performed by the robot 12 on the objects on the conveyor member 18 can be increased, which in turn enables the robot 12 to carry out more complicated and/or rapid tasks. As a further consequence, the risk of malfunction of the robot system 10 can be reduced.

The robot system 10 further comprises a sensor 24. The sensor 24 is a non-contact sensor and may for example be constituted by a 2D or 3D vision sensor (e.g. camera). A Cartesian sensor coordinate system $X_{sen}$ is associated with the sensor 24.

The sensor 24 of the first embodiment is positioned on the conveyor member 18. As can be seen in FIG. 1a, the sensor 24 is oriented vertically upwards. Thereby, the sensor 24 is configured to detect positions of the robot 12 in a non-contact manner. The position detection may be made by any known measurement technique. In FIG. 1a, the sensor 24 is configured to detect positions of a tool 22 of the robot 12 as the positions of the robot 12.

A method for calibrating the robot coordinate system $X_{base}$, $X_{mi}$, $X_{tool}$ with the conveyor coordinate system $X_{con}$ according to the first embodiment will now be described. The sensor 24 is first placed on the conveyor member 18 facing the robot 12. In FIG. 1a, the conveyor member 18 is positioned at a first operating position. When the conveyor member 18 is positioned at the first operating position, the sensor 24 detects a position of the tool 22 in the sensor coordinate system $X_{sen}$. In other words, the transformation between the tool 22 and the sensor 24 is measured. The position of the tool 22 is detected for at least one pose of the robot 12 when the conveyor member 18 is positioned in the first operating position.

The conveyor member 18 (and the sensor 24 thereon) is then moved in the movement direction 20 from the first operating position to a second operating position which is illustrated in FIG. 1b. When the conveyor member 18 is positioned at the second operating position, the sensor 24 detects a further position of the tool 22 in the sensor coordinate system $X_{sen}$. For this detection, the robot 12 may either be in the same pose as in FIG. 1a or in a different pose. In the example of FIGS. 1a and 1b, the robot 12 remains in the same pose when the conveyor member 18 is at the first operating position and at the second operating position.

From the data collected by the sensor 24, the movement direction 20 of the conveyor member 18 can be determined but not the relationship between the robot 12 and the conveyor member 18. It is the relative position of the sensor 24 in space that can be used to find the movement direction 20. The two points of the sensor 24 in space can be used to construct a vector from which the movement direction 20 can be determined.

For example, the movement vector can be calculated and expressed in the robot coordinate system $X_{tool}$ as follows. Let the robot 12 have the same pose for the first and second operating positions. Invert the measured position of the tool 22 at the first operating position of the conveyor member 18. This will give a first position of the sensor 24 in the robot coordinate system $X_{tool}$. Invert the measured position of the tool 22 at the second operating position of the conveyor member 18. This will give a position of the translated sensor 24 in the robot coordinate system $X_{tool}$. Subtract the two positions to get the movement vector expressed in the robot coordinate system $X_{tool}$.

To get the final transformation between the sensor 24 and the conveyor member 18, the transformation between the sensor 24 and the conveyor member 18 may for example be known beforehand. Alternatively, it can e.g. be detected or set during the calibration. Once the calibration is completed, the sensor 24 can be removed from the conveyor member 18 and the robot system 10 is ready for operation.

By using the calibration method according to the first embodiment, all calibration steps can be automated and the calibration accuracy will be high without depending on manual skills or expert skills. It is also easier to simply place the sensor 24 on the conveyor member 18 than mounting the sensor 24 to the tool 22 of the robot 12.

For the calibration, the conveyor member 18 may be moved to further operating positions for detecting further positions of the robot 12 by the sensor 24. At each operating position of the conveyor member 18, the sensor 24 may detect more than one position of the robot 12, e.g. different poses of the robot 12. If several poses of the robot 12 are detected at one operating position of the conveyor member 18, the transformation of the tool coordinate system $X_{tool}$ from the mounting interface coordinate system $X_{mi}$ can be calculated as an extra result.

The transformation of the tool coordinate system $X_{tool}$ from the mounting interface coordinate system $X_{mi}$ may not always be known. The tool 22 is typically customized for the application that the robot 12 shall perform, e.g. picking cheeses. The dimensions of the tool 22 and the location ($X_{tool}$) of the tool 22 will be different for different user scenarios. However, the dimensions of the robot 12 (including the location of the mounting interface $X_{mi}$) is typically known beforehand.

This transformation can however be found by letting the sensor 24 find the positions of the tool 22 ($X_{tool}$) for a number (e.g. at least two) of different poses of the robot 12. By knowing the poses of the robot 12 and by using the data found by the sensor 24, the transformation of the tool coordinate system ($X_{tool}$) from the mounting interface coordinate system $X_{mi}$ of the tool 22 can be calculated. The transformation $X_{mt}$ of the tool coordinate system ($X_{tool}$) from the mounting interface coordinate system $X_{mi}$ can be calculated as follows:

$$X_{tooli}X_{mt}X_{mii}^{-1}=X_{toolj}X_{mt}X_{mij}^{-1} \quad (1)$$

where ($X_{tooli}$) is the $i^{th}$ measured location of ($X_{tool}$),)(thou is the $j^{th}$ measured location of ($X_{tool}$), $X_{mi}$i is the $i^{th}$ location of the mounting interface $X_{mi}$, $X_{mi}$j is the $j^{th}$ location of the mounting interface $X_{mi}$, and i and j are positive integers.

The control system 16 controls the sensor 24 and the conveyor member 18. In this example, the control system 16 also controls the robot 12. The control system 16 is configured to control the sensor 24, the conveyor member 18 and the robot 12 to carry out the calibration methods as described herein.

The control system 16 comprises a data processing device 26 (e.g. a central processing unit, CPU) and a memory 28. A computer program is stored in the memory 28. In the first embodiment, the computer program may comprise program code which, when executed by the data processing device 26, causes the data processing device 26 to control the sensor 24 to detect a position of the robot 12 in the sensor coordinate system $X_{sen}$ of the sensor 24 when the conveyor member 18 is positioned at the first operating position, control the conveyor member 18 to move from the first operating position to the second operating position, control the sensor 24 to detect a position of the robot 12 in the sensor coordinate system $X_{sen}$ when the conveyor member 18 is positioned at the second operating position, and determine the relationship between the robot coordinate system $X_{base}$, $X_{mi}$, $X_{tool}$ and the conveyor coordinate system $X_{con}$ based on the detected positions of the robot 12 in the sensor coordinate system $X_{sen}$. The computer program may also comprise program code which, when executed by the data processing device 26, causes the data processing device 26 to control the conveyor member 18, the sensor 24 and the robot 12 (and possible further robots) according to the present disclosure. The control system 16 is in signal communication with the conveyor member 18, the sensor 24 and the robot 12 (and possible further robots).

Figure 2A:
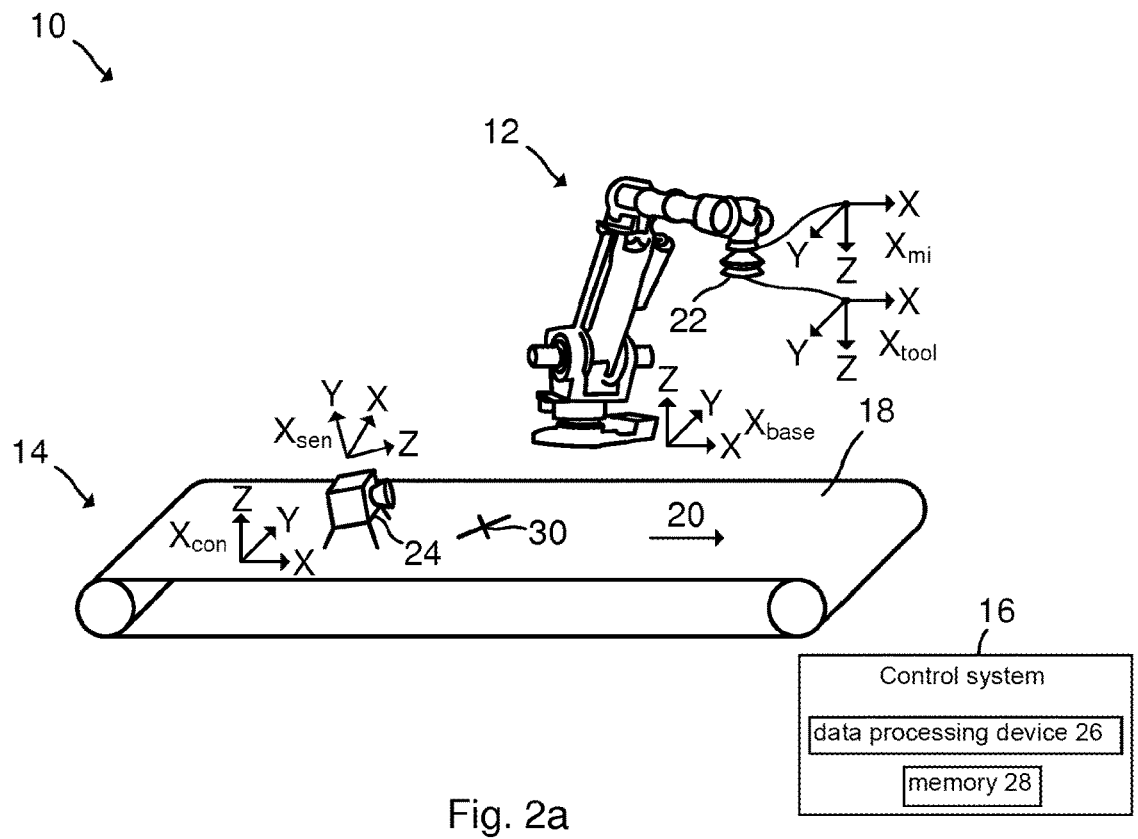
FIG. 2a: schematically represents a perspective view of a robot system according to a second embodiment where a conveyor member is positioned at a first operating position.
Figure 2B:
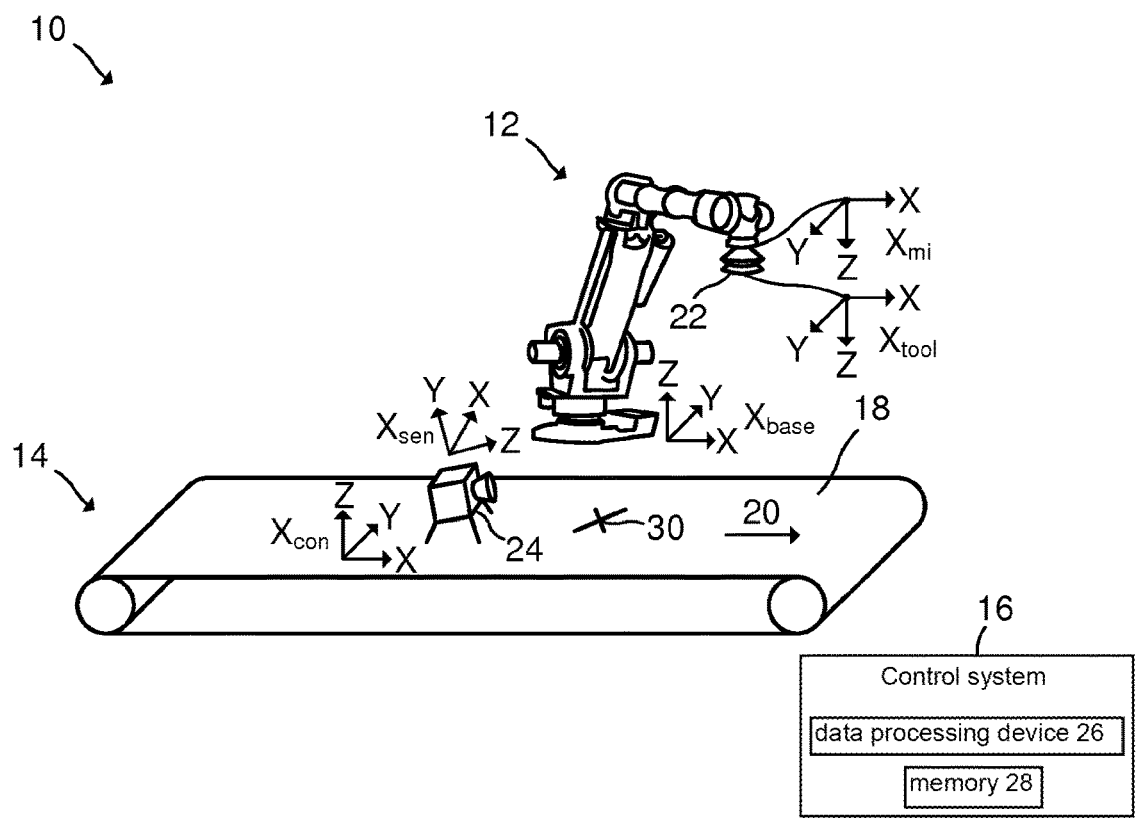
FIG. 2b: schematically represents a perspective view of the robot system in FIG. 2a but where the conveyor member is positioned at a second operating position.

FIGS. 2a and 2b schematically represent perspective views of a robot system 10 according to a second embodiment. Mainly differences with respect to the first embodiment will be described.

The sensor 24 of the second embodiment is also positioned on the conveyor member 18. As can be seen in FIG. 2a, the sensor 24 is angled slightly upwards with respect to horizontal and faces both the conveyor member 18 and the robot 12. Thus, the sensor 24 is configured to detect positions of the robot 12 and to detect positions of the conveyor member 18.

A calibration marker 30 is provided on the conveyor member 18. The sensor 24 can thereby detect the position of the conveyor member 18 in the sensor coordinate system $X_{sen}$. The calibration marker 30 may be any type of feature on the conveyor member 18 that is recognizable by the sensor 24. The calibration marker 30 may be permanently provided on the conveyor member 18 (e.g. a painted mark) or may be temporarily provided on the conveyor member 18 (e.g. an attached pyramid).

A method for calibrating the robot coordinate system $X_{base}$, $X_{mi}$, $X_{tool}$ with the conveyor coordinate system $X_{con}$ according to the second embodiment will now be described. The sensor 24 is first placed on the conveyor member 18 facing both the conveyor member 18 and the robot 12. In FIG. 2a, the conveyor member 18 is positioned at a first operating position. When the conveyor member 18 is positioned at the first operating position, the sensor 24 detects a position of the tool 22 and a position of the calibration marker 30 in the sensor coordinate system $X_{sen}$. In other words, the transformation between the tool 22 and the sensor 24 and the transformation between the calibration marker 30 and the sensor 24 are measured. From these transformations, the transformation between the calibration marker 30 to the tool 22 can be found. The position of the tool 22 is detected for at least one pose of the robot 12 when the conveyor member 18 is positioned in the first operating position.

The conveyor member 18 (and the sensor 24 thereon) is then moved in the movement direction 20 from the first operating position to a second operating position which is illustrated in FIG. 2b. When the conveyor member 18 is positioned at the second operating position, the sensor 24 detects a further position of the tool 22 in the sensor coordinate system $X_{sen}$. For this detection, the robot 12 may either be in the same pose as in FIG. 2a or in a different pose. The sensor 24 may alternatively detect the position of the calibration marker 30 when the conveyor member 18 is in the second operating position or at any other operating position.

From the data of the tool 22 collected by the sensor 24 the movement direction 20 can be determined as described above. To get the final transformation between the tool 22 and the conveyor member 18, the position of the calibration marker 30 in the conveyor coordinate system $X_{con}$ maybe known beforehand. Alternatively, it can e.g. be detected or set during the calibration.

By using the calibration method according to the second embodiment, all calibration steps can be automated and the calibration accuracy will be high without depending on manual skills or expert skills. It is also easier to simply place the sensor 24 on the conveyor member 18 than mounting the sensor 24 to the tool 22 of the robot 12.

Figure 3:
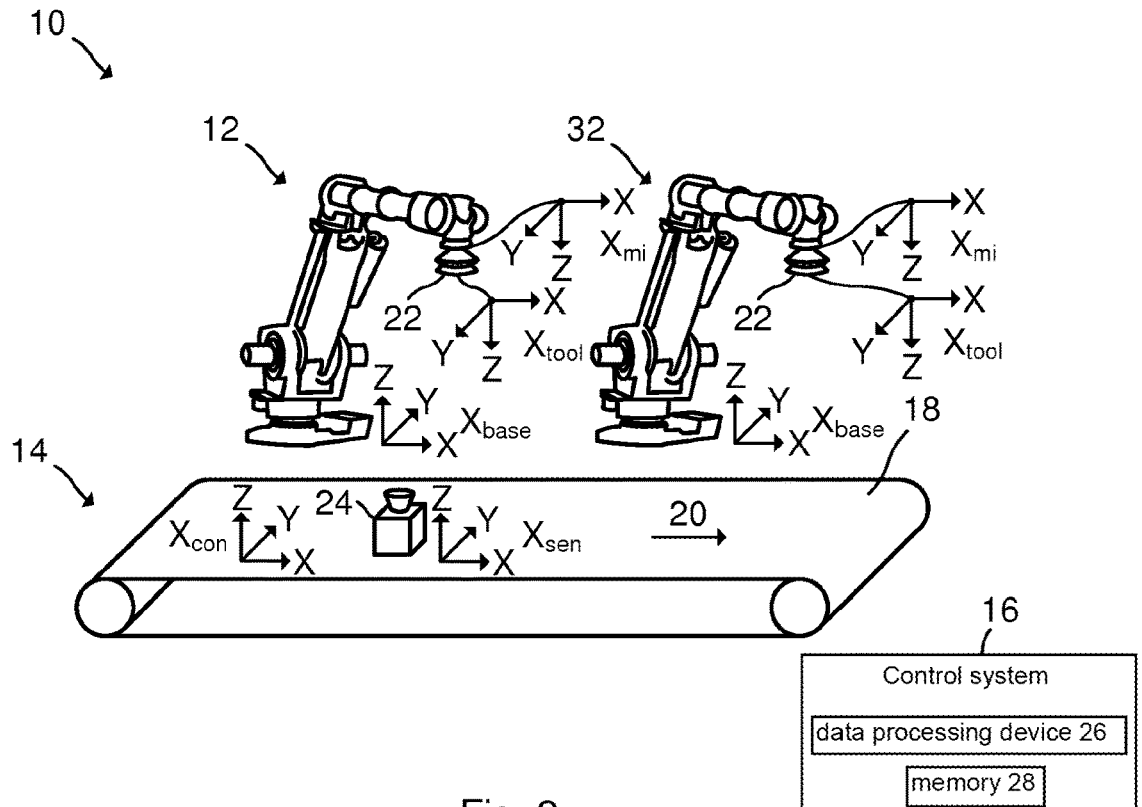
FIG. 3: schematically represents a perspective view of a further robot system according to the first embodiment.
Figure 4:
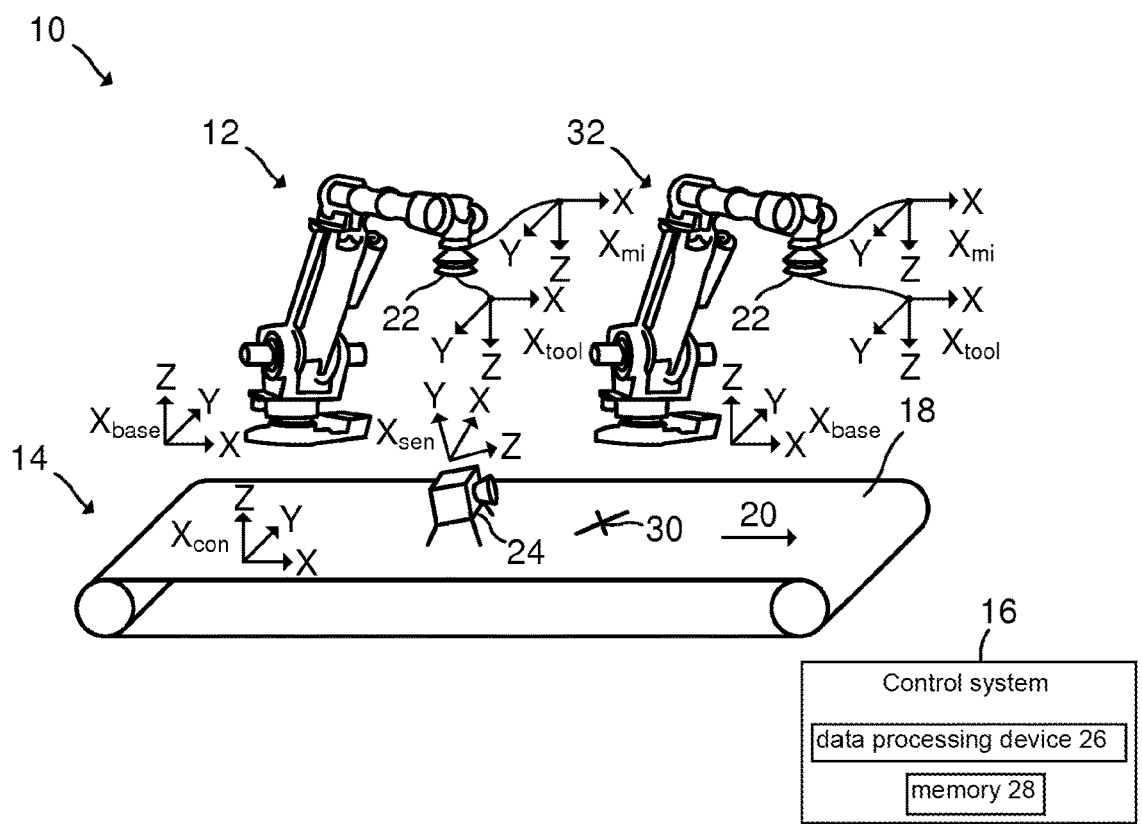
FIG. 4: schematically represents a perspective view of a further robot system according to the second embodiment.

FIG. 3 schematically represents a perspective view of a further robot system 10 according to the first embodiment and FIG. 4 schematically represents a perspective view of a further robot system 10 according to the second embodiment. With collective reference to FIGS. 3 and 4, the robot system 10 comprises two robots, the first robot 12 and a second robot 32.

Each calibration method of the variants of the first and second embodiments in FIGS. 3 and 4 comprises moving the conveyor member 18 from the second operating position to a third operating position, detecting a position of the second robot 32 by the sensor 24 in the sensor coordinate system $X_{sen}$ when the conveyor member 18 is positioned at the third operating position, moving the conveyor member 18 from the third operating position to a fourth operating position, detecting a position of the second robot 32 by the sensor 24 in the sensor coordinate system $X_{sen}$ when the conveyor member 18 is positioned at the fourth operating position, and determining a relationship between a robot coordinate system $X_{base}$, $X_{mi}$, $X_{tool}$ of the second robot 32 and the conveyor coordinate system $X_{con}$ based on the detected positions of the second robot 32 in the sensor coordinate system $X_{sen}$. FIG. 3 illustrates the conveyor member 18 in the second operating position and FIG. 4 illustrates the conveyor member 18 in the third operating position.

Thus, with the variants in FIGS. 3 and 4, several robots 12, 32 along the same conveyor member 18 can be calibrated by just moving the conveyor member 18 forward with the sensor 24 to the next robot 32 after calibrating a previous robot 12. This calibration procedure is very simple and fast.

Figure 5A:
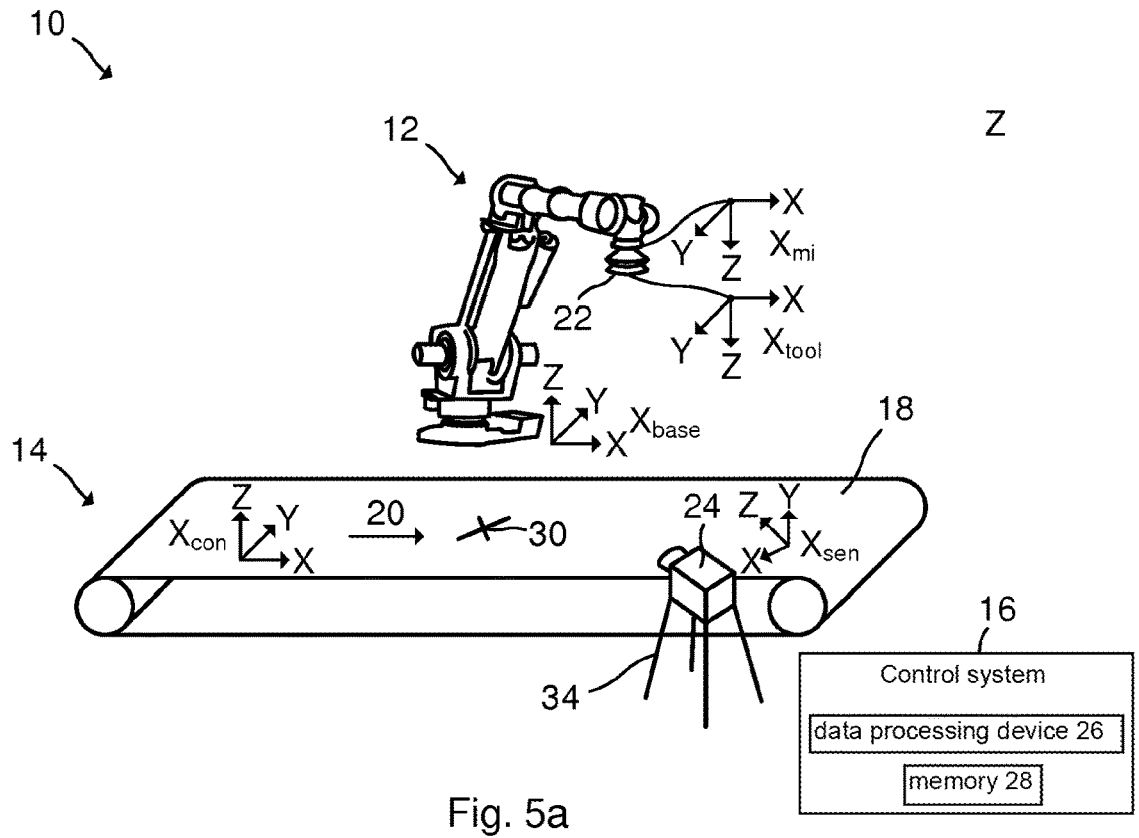
FIG. 5a: schematically represents a perspective view of a robot system according to a third embodiment where a conveyor member is positioned at a first operating position.
Figure 5B:
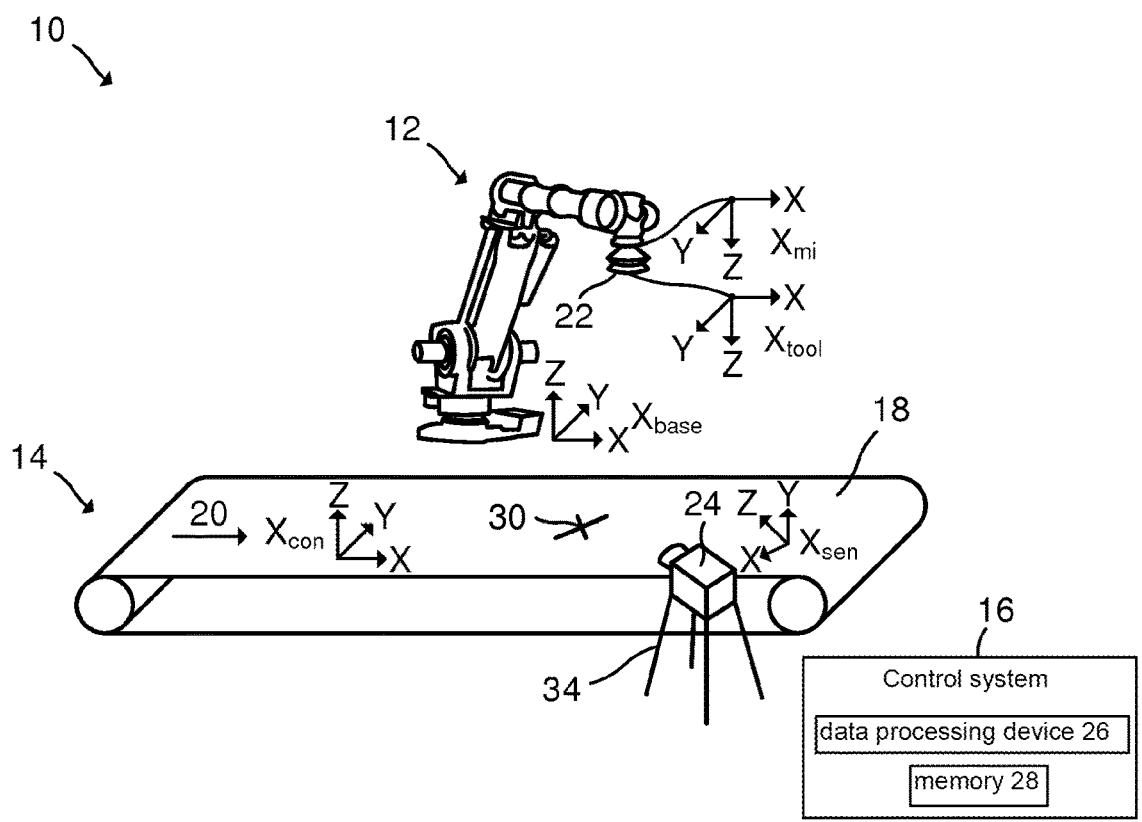
FIG. 5b: schematically represents a perspective view of the robot system in FIG. 5a but where the conveyor member is positioned at a second operating position.

FIGS. 5a and 5b schematically represent perspective views of a robot system 10 according to a third embodiment. Mainly differences with respect to the first and second embodiments will be described.

The sensor 24 of the third embodiment is positioned on a stationary structure 34. In the example of FIG. 5a, the stationary structure 34 is implemented as a stand on the floor. As can be seen in FIG. 5a, the sensor 24 is facing both the robot 12 and the conveyor member 18 such that the calibration marker 30 thereon can be seen. Thus, the sensor 24 is configured to detect positions of the robot 12 and to detect positions of the conveyor member 18. The stationary structure 34 may alternatively be attached to a wall or may be constituted by a stationary part of the conveyor 14.

A method for calibrating the robot coordinate system $X_{base}$, $X_{mi}$, $X_{tool}$ with the conveyor coordinate system $X_{con}$ according to the third embodiment will now be described. The sensor 24 is placed outside the conveyor member 18 facing both the top of the conveyor member 18 and the robot 12. In FIG. 5a, the conveyor member 18 is positioned at a first operating position. When the conveyor member 18 is positioned at the first operating position, the sensor 24 detects a position of the tool 22 and a position of the calibration marker 30 in the sensor coordinate system $X_{sen}$. In other words, the transformation between the tool 22 and the sensor 24 and the transformation between the calibration marker 30 and the sensor 24 are measured. From these transformations, the transformation between the calibration marker 30 to the tool 22 can be found. The position of the tool 22 is detected for at least one pose of the robot 12 when the conveyor member 18 is positioned in the first operating position.

The conveyor member 18, but not the sensor 24, is then moved in the movement direction 20 from the first operating position to a second operating position which is illustrated in FIG. 5b. When the conveyor member 18 is positioned at the second operating position, the sensor 24 detects a further position of the calibration marker 30 in the sensor coordinate system $X_{sen}$.

From the data of the calibration marker 30 collected by the sensor 24 the movement direction 20 can be determined. The relative positions in space of the calibration marker 30 are used to find the movement direction 20. For example, a movement vector can be calculated and expressed in the robot coordinate system $X_{base}$, $X_{mi}$, $X_{tool}$ as follows. The positions of the calibration marker 30 in the sensor coordinate system $X_{sen}$ are subtracted to get a movement vector in the sensor coordinate system $X_{sen}$. This movement vector can be transformed from the sensor coordinate system $X_{sen}$ to the robot coordinate system $X_{base}$, $X_{mi}$, $X_{tool}$ since the location of the robot 12 in the (now fixed) sensor coordinate system $X_{sen}$ has been measured. To get the final transformation between the tool 22 and the conveyor member 18, the position of the calibration marker 30 in the conveyor coordinate system $X_{con}$ may be known beforehand. Alternatively, it can e.g. be detected or set during the calibration.

The sensor 24 may alternatively or additionally detect a position of the tool 22 when the conveyor member 18 is positioned at the second operating position or at any other operating position. For this detection, the robot 12 may either be in the same pose as in FIG. 5a or in a different pose.

By using the calibration method according to the third embodiment, all calibration steps can be automated and the calibration accuracy will be high without depending on manual skills or expert skills. The third embodiment also has the advantage that the sensor 24 can be placed at any suitable location where it can "see" both the conveyor member 18 and the robot 12.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A method for calibrating a robot coordinate system of a robot with a conveyor coordinate system of a movable conveyor member, the method comprising:
providing a sensor configured to detect positions of the robot in a non-contact manner;
detecting a position of the robot by the sensor in a sensor coordinate system of the sensor when the movable conveyor member is positioned at a first operating position, wherein a control system controls the sensor to detect the position of the robot when the movable conveyor member is positioned at the first operating position;
detecting a position of the robot and/or a position of the movable conveyor member by the sensor in the sensor coordinate system when the movable conveyor member is positioned at a second operating position different from the first operating position, wherein a control system controls the sensor to detect the position of the robot and/or the position of the movable conveyor member when the movable conveyor member is positioned at the second operating position;
determining a relationship between the robot coordinate system and the conveyor coordinate system based on at least one detected position of the robot in the sensor coordinate system; and
controlling the robot via the control system, wherein the control system calibrates the robot coordinate system with the conveyor coordinate system according to the relationship automatically.

2. The method according to claim 1, wherein the robot includes a tool and wherein the position of the robot is a position of the tool.

3. The method according to claim 1, wherein the method further includes detecting positions of the robot in different poses by the sensor in the sensor coordinate system when the movable conveyor member is in the first operating position and/or when the movable conveyor member is in the second operating position.

4. The method according to claim 1, wherein the sensor is positioned on the movable conveyor member, and wherein the method includes detecting a position of the robot by the sensor in the sensor coordinate system when the movable conveyor member is positioned at the first operating position and detecting a position of the robot by the sensor in the sensor coordinate system when the movable conveyor member is positioned at the second operating position.

5. The method according to claim 4, wherein the method further comprises:
determining a movement direction of the movable conveyor member in the robot coordinate system based on the detected positions of the robot in the sensor coordinate system; and
determining a relationship between the robot coordinate system and the conveyor coordinate system based on the determined movement direction of the movable conveyor member.

6. The method according to claim 4, wherein the robot constitutes a first robot and wherein the method further comprises:
moving the movable conveyor member from the second operating position to a third operating position;
detecting a position of a second robot by the sensor in the sensor coordinate system when the movable conveyor member is positioned at the third operating position;
moving the movable conveyor member from the third operating position to a fourth operating position;
detecting a position of the second robot by the sensor in the sensor coordinate system when the movable conveyor member is positioned at the fourth operating position; and
determining a relationship between a robot coordinate system of the second robot and the conveyor coordinate system based on the detected positions of the second robot in the sensor coordinate system.

7. The method according to claim 4, wherein the relationship between the sensor coordinate system and the conveyor coordinate system is known beforehand.

8. The method according to claim 4, wherein the sensor is additionally configured to detect positions of the movable conveyor member in a non-contact manner.

9. The method according to claim 8, wherein the method further comprises:
detecting a position of the movable conveyor member by the sensor in the sensor coordinate system; and
determining a relationship between the sensor coordinate system and the conveyor coordinate system based on the detected position of the movable conveyor member in the sensor coordinate system.

10. The method according to claim 9, wherein at least one calibration marker is provided on the movable conveyor member for the detection of the position of the movable conveyor member.

11. The method according to claim 10, wherein the position of the at least one calibration marker in the conveyor coordinate system is known beforehand.

12. The method according to claim 1, wherein the sensor is positioned on a stationary structure such that the movable conveyor member moves relative to the sensor and wherein the sensor is additionally configured to detect positions of the movable conveyor member in a non-contact manner.

13. The method according to claim 12, wherein at least one calibration marker is provided on the movable conveyor member for the detection of the position of the movable conveyor member, and the method further comprises:
    detecting a position of the at least one calibration marker by the sensor in the sensor coordinate system when the movable conveyor member is positioned at the first operating position;
    detecting a position of the at least one calibration marker by the sensor in the sensor coordinate system when the movable conveyor member is positioned at the second operating position;
    determining a movement direction of the movable conveyor member in the robot coordinate system based on the detected positions of the at least one calibration marker in the sensor coordinate system; and
    determining a relationship between the robot coordinate system and the conveyor coordinate system based on the determined movement direction of the movable conveyor member.

14. A robot system comprising at least one robot, a movable conveyor member, and a sensor configured to detect positions of the robot in a non-contact manner, wherein the robot system is configured to:
    detect a position of the robot by the sensor in a sensor coordinate system of the sensor when the movable conveyor member is positioned at a first operating position, wherein a control system controls the sensor to detect the position of the robot when the movable conveyor member is positioned at the first operating position;
    detect a position of the robot and/or a position of the movable conveyor member by the sensor in the sensor coordinate system when the conveyor member is positioned at a second operating position different from the first operating position, wherein the control system controls the sensor to detect the position of the robot and/or the position of the movable conveyor member when the movable conveyor member is positioned at the second operating position;
    determine a relationship between a robot coordinate system of the robot and a conveyor coordinate system of the movable conveyor member based on at least one detected position of the robot in the sensor coordinate system; and
    control the robot via the control system, wherein the control system calibrates the robot coordinate system with the conveyor coordinate system according to the relationship automatically.

15. A control system for calibrating a robot coordinate system of a robot with a conveyor coordinate system of a movable conveyor member in a robot system comprising the robot, the movable conveyor member and a sensor configured to detect positions of the robot in a non-contact manner, the control system including a data processing device and a memory having a computer program stored thereon, the computer program having a program code which, when executed by the data processing device, causes the data processing device to perform the steps of:
    controlling the sensor to detect a position of the robot in a sensor coordinate system of the sensor when the movable conveyor member is positioned at a first operating position;
    controlling the sensor to detect a position of the robot and/or a position of the movable conveyor member in the sensor coordinate system when the movable conveyor member is positioned at a second operating position different from the first operating position;
    determining a relationship between the robot coordinate system and the conveyor coordinate system based on at least one detected position of the robot in the sensor coordinate system; and
    controlling the robot upon calibrating the robot coordinate system with the conveyor coordinate system according to the relationship automatically.

* * * * *